United States Patent
Brustad et al.

(10) Patent No.: US 6,330,270 B1
(45) Date of Patent: Dec. 11, 2001

(54) METHOD FOR WEIGHING ELECTRODES IN ELECTRIC SMELTING FURNACES

(75) Inventors: Georg Brustad; Frode Haugen; Halvard Tveit, all of Trondheim; Aasgeir Valderhaug, Kristiansand, all of (NO)

(73) Assignee: Elkem ASA (NO)

( * ) Notice: Subject to any disclaimer, the term of this patent is extended or adjusted under 35 U.S.C. 154(b) by 0 days.

(21) Appl. No.: 09/646,731

(22) PCT Filed: Mar. 22, 1999

(86) PCT No.: PCT/NO99/00095

§ 371 Date: Sep. 19, 2000

§ 102(e) Date: Sep. 19, 2000

(87) PCT Pub. No.: WO99/50625

PCT Pub. Date: Oct. 7, 1999

(30) Foreign Application Priority Data

Mar. 31, 1998 (NO) .................................................. 981445

(51) Int. Cl.[7] .................................................. H05B 7/148
(52) U.S. Cl. .............................. 373/105; 373/70; 373/104
(58) Field of Search .................................. 373/60, 69, 70, 373/88, 89, 94, 98, 100, 102, 104, 105, 106

(56) References Cited

U.S. PATENT DOCUMENTS

| 3,914,526 | 10/1975 | Markarian et al. ..................... 373/70 |
| 4,303,797 | 12/1981 | Roberts ................................... 373/70 |
| 4,569,056 | 2/1986 | Veil, Jr. .................................. 373/70 |
| 4,742,528 | 5/1988 | Stenzel .................................. 373/70 |
| 5,274,662 | 12/1993 | Krepel ................................... 373/69 |

FOREIGN PATENT DOCUMENTS

| 0475008 | 3/1992 | (EP) . |
| 178739 | 2/1996 | (NO) . |

*Primary Examiner*—Tu Ba Hoang
(74) *Attorney, Agent, or Firm*—Bierman, Muserlian and Lucas

(57) ABSTRACT

The present invention relates to a method for weighing an electrode submerged in the charge of an electric smelting furnace. The electrode is moved in vertical direction at least once, whereafter the electrode is lifted and the weight of the electrode is registered shortly after the electrode has been lifted.

7 Claims, 4 Drawing Sheets

METHOD FOR WEIGHING ELECTRODES IN ELECTRIC SMELTING FURNACES

FIELD OF INVENTION

Figure 1:
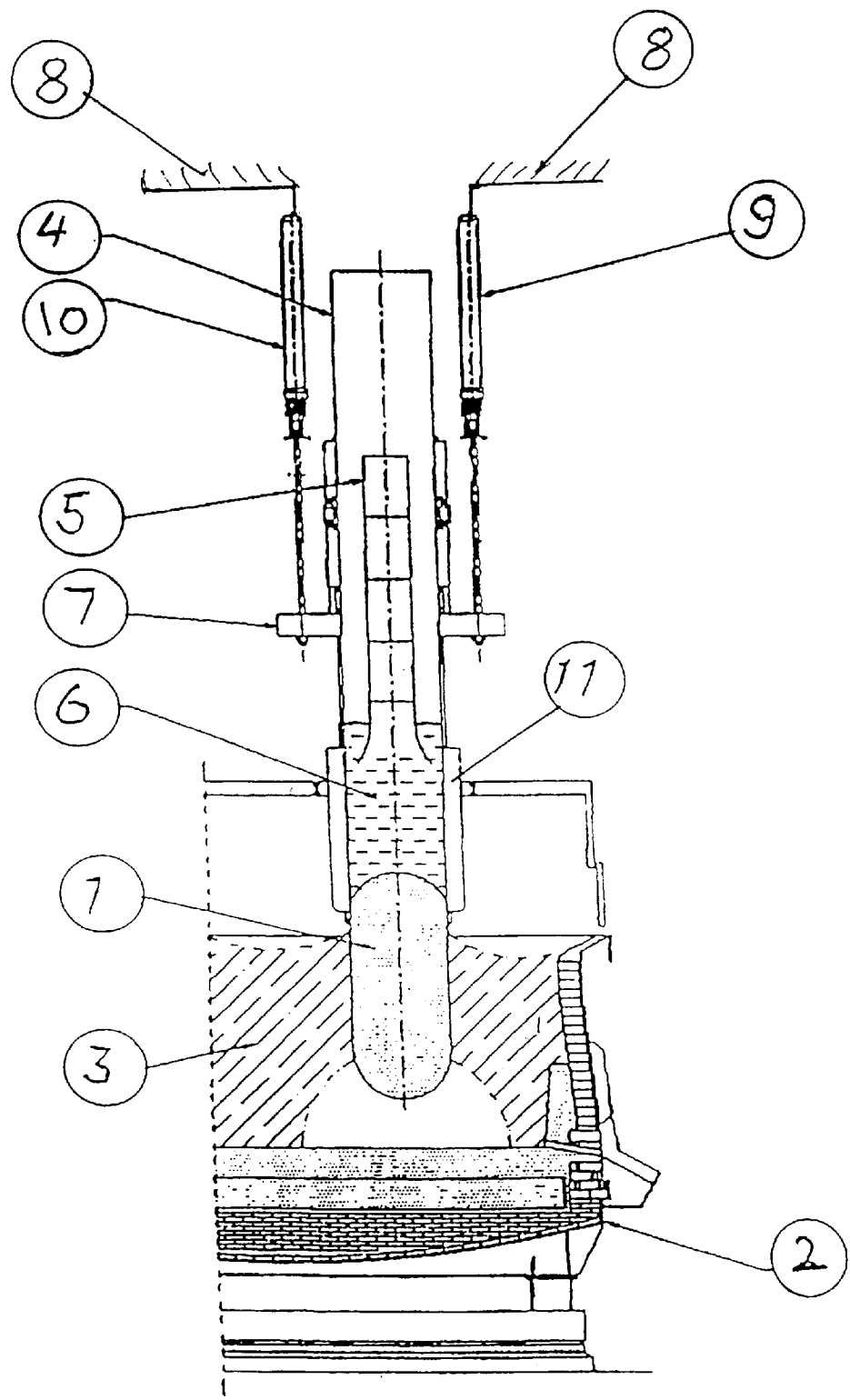

The present invention relates to a method for weighing consumable electrodes submerged in the charge in electric smelting furnaces.

BACKGROUND ART

From Norwegian patent No. 178739 it is known a method for calculating the length of consumable electrodes which are submerged in the charge of electric smelting furnaces, where the length of the electrode is calculated based on registering the weight of the electrodes. According to the Norwegian patent the weight of an electrode is being registered at constant time intervals of up till 5 minutes and where the average value for a plurality of registered weight values is calculated and plotted versus time. Thereafter a curve running thorugh the average values for a minimum period of 24 hours is calculated and this curve is being used to calculate the weight of the electrode after corrections have been made for added electrode paste and added electrode casing. Based on this, the electrode length below the electrode holder can be calculated taking into consideration the diameter and the density of the electrode.

Each registered weight value is, according to Norwegian patent No. 178739, corrected due to possible movement of the electrode during weighing. The registered weight values are further compared with preset upper and lower limits for registered weight values and registered weight values over and below the upper and lower limits are excluded.

It has been found that the method according to Norwegian patent No. 178739 does not give sufficiently accurate results, as the calculated average electrode weight for some time intervals can give a high deviation even if the registered weight values are corrected as described in the patent. This is particularly the case for deviations due to dynamic and static friction between the electrode and the furnace charge. Further varying pressure in the reaction zone in the furnace can influence the registered electrode weight.

DISCLOSURE OF INVENTION

It is an object of the present invention to provide a method for weighing electrodes in electric smelting furnaces which method substantially eliminates the influence of dynamic and static friction between the electrode and the furnace charge and the influence of varying pressure in the reaction zone.

Accordingly, the present invention relates to a method for weighing an electrode submerged in the charge of an electric smelting furnace, which method is characterized in that the electrode is being moved in vertical direction at least once, whereafter the electrode is lifted and that the weight of the electrode is registered shortly after the electrode has been lifted.

According to a preferred embodiment of the method, the electrode is moved in vertical direction at least two times at short time intervals before the electrode is lifted and the weight is registered.

According to another embodiment of the method the weight of the electrode is registered after the electrode has been lifted at least two times at short time intervals.

The weight is preferably registered by registering the oil pressure in the hydraulic cylinders from which the electrode is suspended and which moves the electrode in vertical direction. The oil pressure in the cylinders is registered at a frequency of at least 1 Hz and preferably at a frequency between 10 and 300 Hz.

Alternatively the weight of the electrode can be registered by means of load cells, for instance such as described in Norwegian patent No. 178739.

The electrode weight can either be registered when the electrodes due to the automatic electrode regulation has been lifted or lowered at least once and thereafter has been lifted. Alternatively the electrode can be deliberately moved at least once in vertical direction and thereafter lifted before the weight is registered.

It has surprisingly been found that by the method according to the present invention substantially all influence of dynamic and static friction between the electrode and the furnace charge is eliminated. Also the influence of pressure in the reaction zone is substantially reduced. The reason for this is thought to be that during the first vertical movement of the electrode static friction and pressure in the reaction zone will influence substantially on the registered weight of the electrode. When the electrode is moved in vertical direction the first time, the electrode will be loosened from the charge and when the electrode thereafter is lifted, the static friction will be substantially eliminated. Also the dynamic friction between the electrode and the furnace charge will be substantially lower when the electrode is lifted after first having been moved in vertical direction. When the electrode is moved in vertical direction the first time, also the pressure in the reaction zone will be lowered. By moving the electrode in vertical direction at least two times before the electrode is lifted and the weight is registered, it has been found that dynamic and static friction and pressure in the reaction zone will not substantially influence the weight of the electrode.

Tests have shown that by the method of the present invention a very accurate weighing of the electrode is obtained. For a self-baking electrode of the Sø derberg type with a total electrode weight of about 60 tons it has been found that the accuracy in the registered electrode weight will be in the range of 100–200 kg. By the method of the present invention it is thereby possible to detect weight changes on the electrode as small as 100–200 kg. This makes it possible to detect even small electrode breakages and pealing of small pieces from the electrode tip. Further the weight of the electrode can be used to estimate the position of the electrode tip in the furnace at any time.

By weighing of the electrode one has, as described in Norwegian patent No. 178739, to take into consideration the weight of added electrode casings and added electrode paste for self-baking electrodes and to the weight of added electrode lengths for prebaked electrodes.

SHORT DESCRIPTION OF THE DRAWINGS

Figure 2:
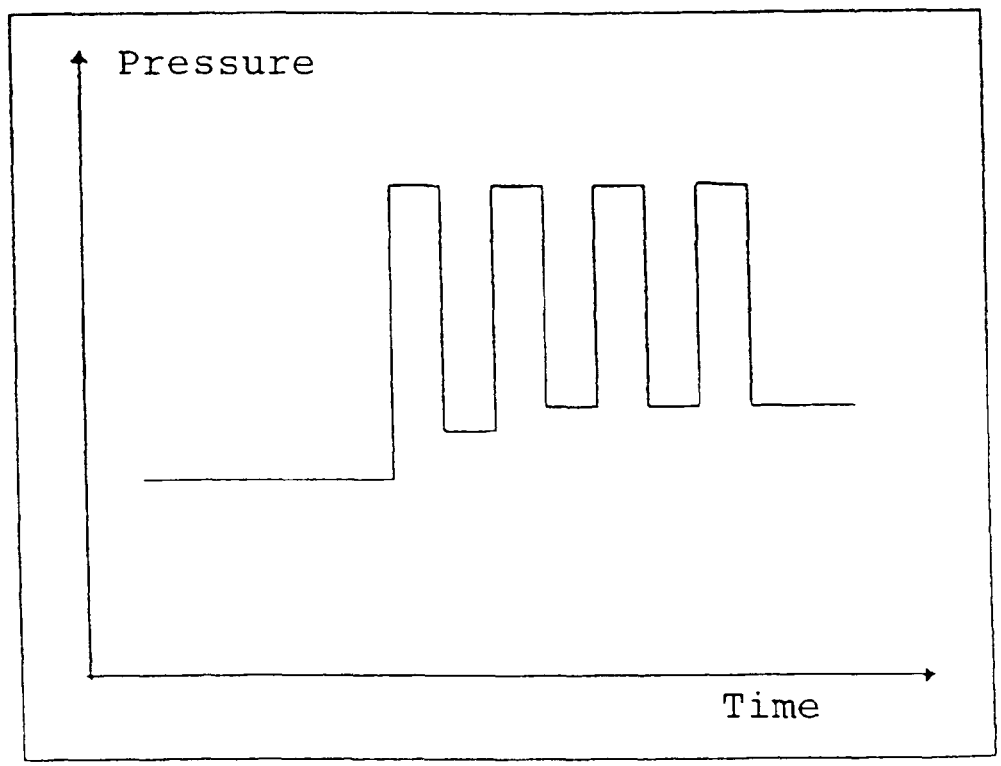
Figure 3:
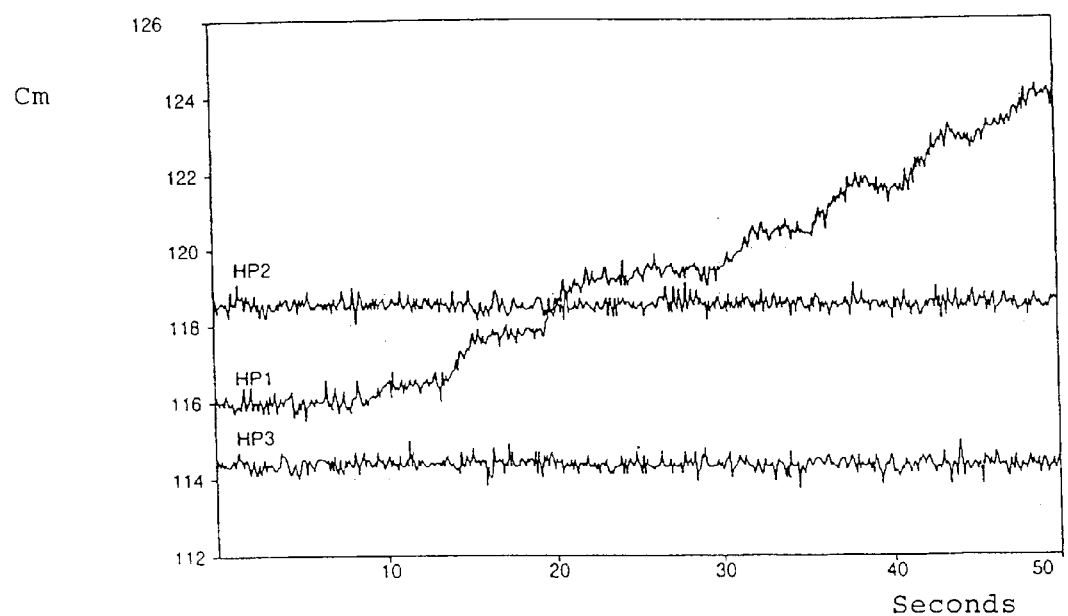
Figure 4:
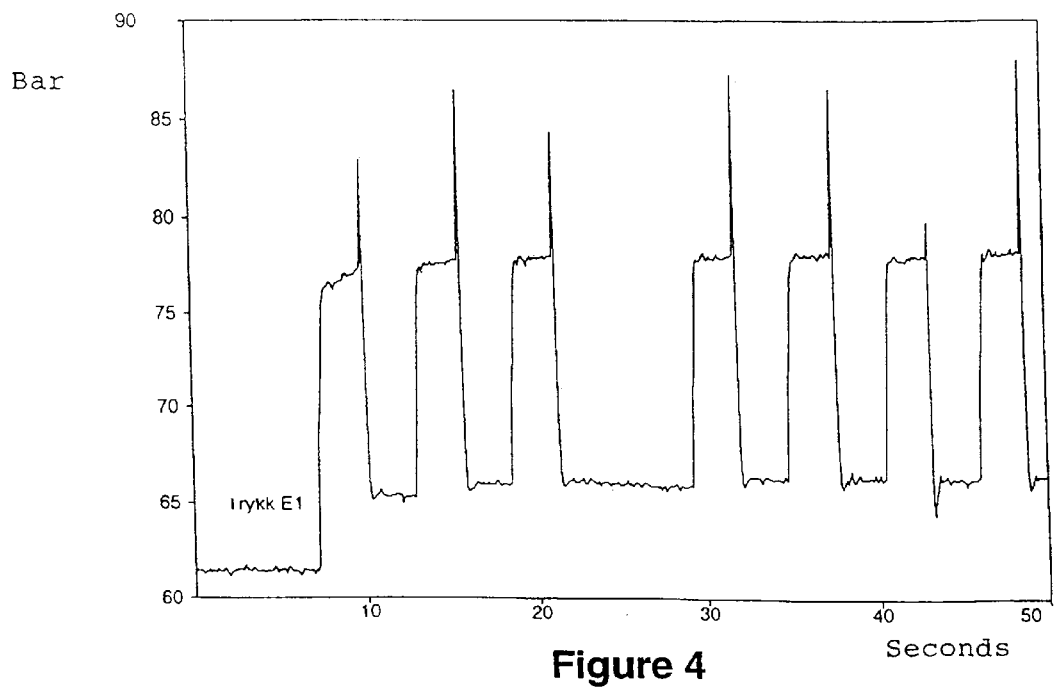
Figure 5:
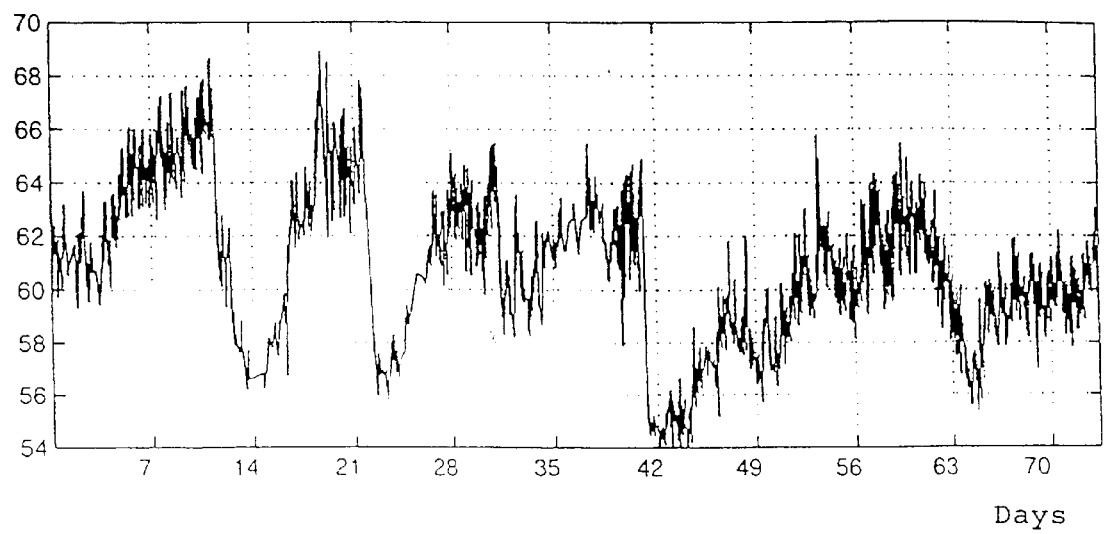

FIG. 1 shows a consumable electrode in an electric smelting furnace,

FIG. 2 shows a typical diagram for pressure versus time for repeated lifting of an electrode submerged in an electric smelting furnace, FIG. 3 shows a diagram for electrode holder position as a function of time for the electrodes in an electric smelting furnace equipped with three electrodes, FIG. 4 shows registered pressure for the electrode regulating cylinders as a function of time for electrode No. 1 registered during the same time interval as in FIG. 3, and where, FIG. 5 shows the variation in the weight of an electrode versus time for a longer period of time where the weight has been registered by the method of the present invention.

DETAILED DESCRIPTION OF THE INVENTION

On FIG. 1 there is shown a self-baking electrode 1 in an electric smelting furnace 2 containing a furnace charge 3. The electrode 1 is equipped with an electrode casing 4. Blocks 5 of solid unbaked electrode paste are added at intervals to the electrode casing 4. The blocks 5 soften when heated and forms a liquid electrode paste 6. The electrode 1 is carried by an electrode frame 7 which is suspended from the building construction 8 by means of two hydraulic electrode regulation cylinders 9, 10. An electrode holder is indicated by reference numeral 11.

During operation of the electrode 1 the electrode 1 is moved up or down in order to maintain a preset set-point for the electrode. The electrode current for the electrode 1 can for instance be used as set-point, with an upper and lower limit for change in current before the electrode 1 is moved up or down. When the current for the electrode 1 for a preset time interval is above the upper limit, the electrode regulation cylinders 9, 10 will lift the electrode for a preset time interval. If the current after having lifted the electrode 1 still is above the upper limit, the electrode regulation cylinders 9, 10 will again lift the electrode for the preset time interval. This is continued until the current again is within the interval between the upper and lower limits for the current. In the same way the electrode 1 will be lowered if the current is below the lower limit for the current. Other parameters than the current can be used for electrode regulations, such as for instance electric resistivity or voltage.

By lifting of the electrode 1, the electrode will normally have to be lifted a number of times with short intervals in order to adjust the current to a value within the upper and lower limits.

In connection with the present invention it has been found that during the first lifting of the electrode the electrode is lifted a shorter length than expected. It has been found that the reason for this is mainly high dynamic and static friction between the electrode and the furnace charge. During the first lifting of the electrode 1, the electrode 1 will, however, be released from the charge and the dynamic and static friction will thus be strongly reduced when the electrode is being lifted for a second time shortly after that the electrode has been lifted for the first time. Also if the pressure in the reaction zone is high, this pressure is released when the electrode is lifted the first time whereby the pressure in the reaction zone will have a minimal impact on the weight of the electrode when the electrode is lifted a second time.

On FIG. 2 there is shown a typical diagram for pressure versus time for electrode regulation cylinders 9, 10 during a number of liftings of an electrode 1. At the start the electrode 1 is not moving and the pressure is constant. When the electrode is lifted, the pressure increases momentarily to the working pressure and remains at this pressure as long as the electrode is being lifted. When the lifting is finished, the pressure falls and remains constant until the electrode again is being lifted. As can be seen from FIG. 2, the pressure after finishing the first lifting of the electrode is at a higher value than before starting the first lifting of the electrode. By repeating the lifting of the electrode the pressure after finishing each lift will increase until it reaches a maximal value. This maximal value for measured pressure after a number of lifting of the electrode is a measure for the weight of the electrode.

EXAMPLE

The method according to the present invention was tested on a commercial ferrosilicon furnace equipped with three electrodes of the Søderberg type.

The electrode holder position for the three electrodes were continuously registered. During the test electrodes Nos. 2 and 3 were not regulated up or down, while electrode No. 1 was lifted a number of times at short time intervals. The electrode holder positions versus time for the three electrodes are shown in FIG. 3. The total pressure in the electrode regulation cylinder for electrode No. 1 was registered at a frequency of 10 Hz during the test and the result are shown in FIG. 4.

As can be seen from FIG. 4, electrode No. 1 was lifted seven times during period of 50 seconds. As can be seen from FIG. 3 the first lifting of the electrode resulted only in a very small movement of the electrode upwards, while the remainder liftings of electrode No. 1 clearly can be seen in FIG. 3.

From FIG. 4 it can be seen that the registered pressure in the electrode regulation cylinders for electrode No. 1 after the first lifting of the electrode was about 65 bar, while the pressure after the second lifting was about 66 bar and that the pressure remained at this level after the remaining liftings of electrode No. 1. It shall be mentioned to FIG. 4 that the pressure peak which is shown at the end of each lifting of the electrode, is due to pressure shocks in connection with opening/closing of valves in the hydraulic system for the electrode regulation cylinders.

FIG. 5 shows registered weight of a Sø derberg electrode in a ferrosilicon furnace during a period of 75 days by the use of the method according to the present invention.

From FIG. 5 it can clearly be seen that electrode breakages and the losses of minor pieces from the electrode tip can be detected. Thus FIG. 5 shows that major electrode breakages with a weight loss of about 10 tons, have occurred after 11 days, 22 days and 41 days, while minor electrode breakages with a weight loss of about 5 tons, have occurred after 19 days and 31 days. The minor electrode breakages would have been very difficult to detect without registering the weight of the electrode according to the method of the present invention.

What is claimed is:

1. Method for weighing an electrode submerged in the charge of an electric smelting furnace, characterized in that the electrode is being moved in vertical direction at least once, whereafter the electrode is lifted and that the weight of the electrode is registered shortly after the electrode has been lifted.

2. Method according to claim 1, characterized in that the electrode is moved in vertical direction at least two times at short time intervals before the electrode is lifted and the weight is registered.

3. Method according to claim 1, characterized in that the weight of the electrode is registered after the electrode has been lifted at least two times at short time intervals.

4. Method according to claim 1, characterized in that the weight is registered by registering the oil pressure in the hydraulic cylinders from which the electrode is suspended and which moves the electrode in vertical direction.

5. Method according to claim 4, characterized in that the oil pressure in the hydraulic cylinders is registered at a frequency of at least 1 Hz.

6. Method according to claim 5, characterized in that the oil pressure in the hydraulic cylinders is registered at a frequency of between 10 and 300 Hz.

7. Method according to claim 1, characterized in that the weight of the electrode is registered by means of load cells arranged in the hydraulic cylinders which hold and regulate the electrode.

* * * * *